Dec. 2, 1930.  C. H. STERLING  1,783,393
OVERSPEED TRANSMISSION
Filed Dec. 24, 1926
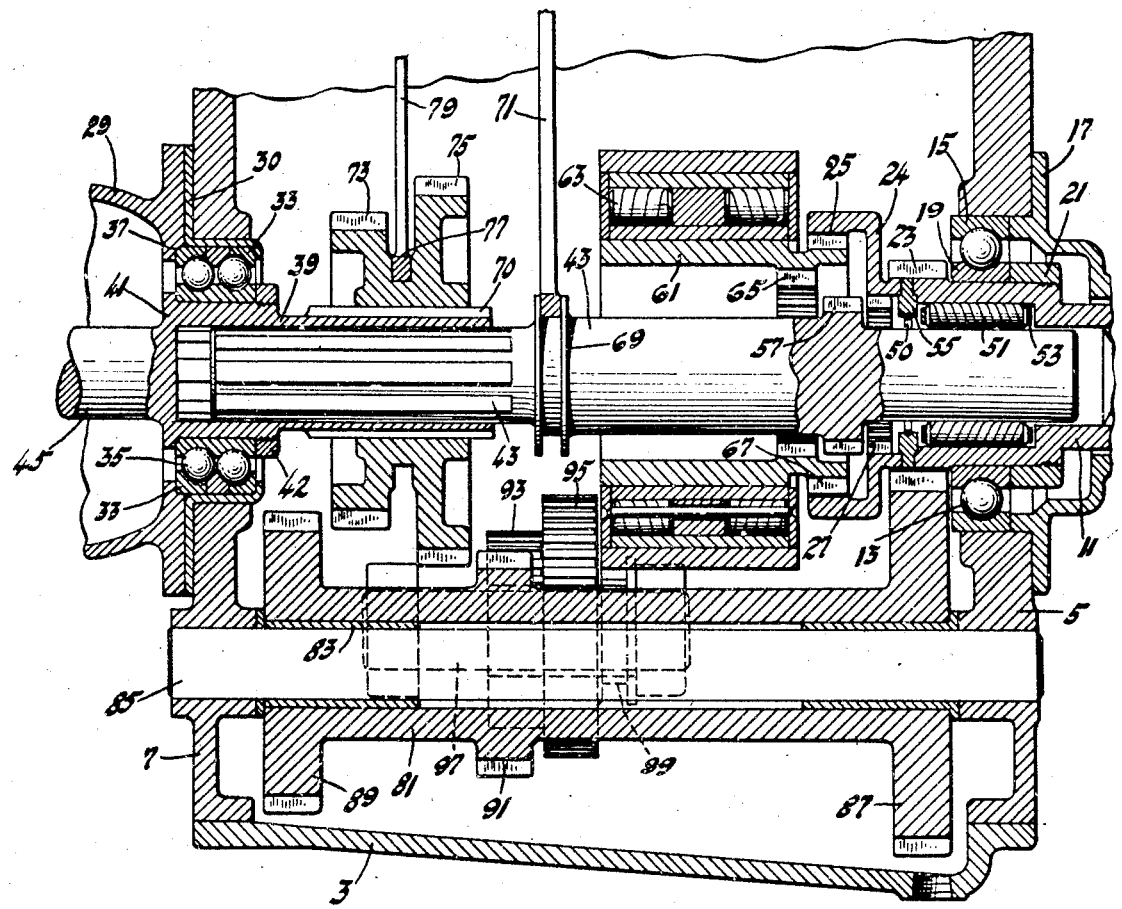
Inventor
Claude H. Sterling
By Blackmore, Spencer & Hurd
Attorneys Patented Dec. 2, 1930

1,783,393

UNITED STATES PATENT OFFICE

CLAUDE H. STERLING, OF DETROIT, MICHIGAN, ASSIGNOR TO GENERAL MOTORS RESEARCH CORPORATION, OF DETROIT, MICHIGAN, A CORPORATION OF DELAWARE

OVERSPEED TRANSMISSION

Application filed December 24, 1926. Serial No. 156,871.

This invention relates to an improvement in gearing. It has been designed for motor vehicles although its advantageous structure is useful elsewhere.

Among the objects of the invention are the provision of four-forward speeds permitting the use of a more advantageous gear ratio between the pinion and ring gear at the rear axle; an arrangement by which the gear ratios commonly employed in driving are quite free from noise; compactness, strength, simplicity and convenience in gear shifting are also among the objects sought to be obtained. Among the differences which more strikingly distinguish this transmission from others, there may be mentioned in this brief statement the sliding spline shaft which sliding movement is made use of to effect the positions of the parts for the two highest speeds. Other differences and other objects and advantages will be apparent on reading the following specification and an examination of the accompanying drawing.

In the drawing the single figure illustrates the improved transmission in vertical longitudinal section.

Referring by reference characters to the drawing, 3 represents the transmission housing as a whole. It has a front wall 5 and a rear wall 7. A shaft 11 driven by the motor through the instrumentality of the clutch enters the housing through the front wall 5.

The shaft 11 passes through a bearing 13 in the front wall. The bearing includes an outer race 15 positioned by a cover member 17. The inner race 19 positioned between a sleeve 21 threaded on an enlarged part of the shaft 11 and external teeth forming a gear 23. Beyond the gear 23 the shaft 11 has a radial flange 24 from which projects an internal gear 25. Beneath gear 23 are internal teeth constituting a clutch member 27.

Positioned adjacent the rear housing wall is a member 29 housing the usual universal joint. Between member 29 and the housing wall is a flanged cup 30, the flange lying between the housing wall and the universal joint housing 29, and the cup part extending through the opening in the housing and engaging the inner side of the outer race 33 for the bearing 35. The outer side of the outer race is engaged by a shoulder 37 on the member 29. The inner bearing race is carried on an elongated sleeve 39 there being a flange 41 on one side and a threaded sleeve 42 on the other side of the ball race.

Sleeve 39 is internally splined to slidably but non-rotatably carry the externally splined transmission or spline shaft 43. It will be observed that extensions 45 of collar 39 serve to form the forward parts of the universal joint and that spline shaft 43 does not, itself, extend through the rear wall. The spline shaft extends forwardly and at its front end is reduced and piloted within the enlarged end of shaft 11 where roller bearings 51 are made use of. Suitable retainers 53 and locking pins 55, the latter held in position by a resilient ring 50 maintain the bearing 51 in position. Inwardly of flange 24 on shaft 11 the spline shaft is provided with radial teeth 57. Surrounding the aligned clutch and spline shafts is a ring gear 61 mounted for rotation eccentrically with relation to the aligned shafts by means of bearings 63 in the housing. The ring gear 61 is formed with an internal gear 65 on its inner surface and between its ends, and also with an external gear 67 on its outer surface and at its forward end. This external gear 67 is in constant driving engagement with the gear 25 on the clutch shaft 11.

Provision is made for moving spline shaft 43 forwardly to effect a direct clutch engagement with the clutch shaft 11 through the instrumentality of teeth 57 and 27. In this position the spline shaft is driven at the same speed as the clutch shaft and the gear ring 61 rotates idly. If the spline shaft is moved to the rear so that gear elements 65 and 57 engage each other the ring gear 61 is underload and the spline shaft is driven through the ring gear. It will be seen that under these circumstances an external-internal gear train drives the ring gear 61 and another external-internal gear train drives shaft 43 from the ring gear 61. In each of these gear trains the number of teeth in the two gears is very nearly alike with the result that the step-up drive is comparatively quiet. It may be here stated, although it is obvious, that should it be desired to employ the direct drive for the highest speed and the double external-internal gear train for a step-down this result can readily be obtained by a suitable change in the gearing operating through the ring gear. To move the spline shaft it is provided with a collar 69 engaged by the fork 71 connected as usual to the sliding rod, not shown. Such axial movement is made possible by the splined relation of the spline shaft 43 in the sleeve 39. Such a movement will be made in changes from third to fourth speeds and from fourth to third speeds under which circumstances the spline shaft is, of course, rotating. The rotary motion combined with the axial movement gives a spiral movement within the in bearing 51 which movement fecilitates the act of gear shifting.

Slidable on splines 70 on sleeve 39 is a pair of gears 73 and 75 united or integral having a collar 77 for a fork 79.

The countershaft is shown at 81. It turns on bearings 83 on a shaft 85 mounted in the front and rear walls of the gear housing. The countershaft has a spur gear 87 in constant driving engagement with gear 23 on the clutch shaft. Countershaft 81 is also provided with gear 89 and 91 for selective engagement with gears 73 and 75 respectively, for driving in second speed and in low speed.

Reverse driving is to be had by the use of the combined and united gears 93 and 95 slidable on shaft 97 suitably mounted in the housing. These gears have a collar 99 to be engaged by a fork and rod, not shown. When moved to the left in the figure gear 93 meshes with gear 75 and gear 95 meshes with gear 91, whereupon the spline shaft is driven at a low speed but in a reverse direction.

The assembly is compact, shifting is simple and easy, the parts are economical to manufacture and third and fourth speeds are comparatively quiet. The presence of the fourth speed makes it possible to employ a more advantageous ratio at the rear axle which means lower engine speeds and fuel economy for a given rate of travel of the car.

I claim:

1. Aligned driving and driven members, the latter composed of telescopic parts and a countershaft, gearing between the countershaft and the outmost of said telescopic parts, the inner part of the driven member being axially movable into clutched engagement with the driving shaft, a gear ring eccentrically surrounding the common axis of said aligned members, drive mechanism between said driving shaft and eccentric gear ring and between said driving shaft and said countershaft, gear elements on said eccentric ring and the inner driven member to be engaged upon a movement of the axially movable member to a predetermined position.

2. In a change speed transmission, a housing, an aligned driving shaft and driven sleeve, bearings for said shaft and sleeve in opposite end walls of said housing, a driven shaft slidably and rotatably supported at one end within said driving shaft and slidably and nonrotatably supported at its other end in said driven sleeve, means to effect driving engagement between said driving shaft and driven shaft and sleeve at a plurality of speed ratios upon axial movements of the driven shaft together with a countershaft, means to drive the countershaft, and shiftable gearing between the countershaft and the driven sleeve.

In testimony whereof I affix my signature.

C. H. STERLING.